United States Patent [19]
Stein

[11] Patent Number: 5,905,947
[45] Date of Patent: *May 18, 1999

[54] ELECTRONIC AUDIO SYSTEM CAPABLE OF COMMUNICATING DATA SIGNALS OVER WIRELESS NETWORKS

[75] Inventor: Per Stein, Stockholm, Sweden

[73] Assignee: Telefonaktiebolaget LM Ericsson, Stockholm, Sweden

[*] Notice: This patent is subject to a terminal disclaimer.

[21] Appl. No.: 08/467,563

[22] Filed: Jun. 6, 1995

Related U.S. Application Data

[63] Continuation-in-part of application No. 08/353,966, Dec. 12, 1994, Pat. No. 5,628,055, which is a continuation of application No. 08/026,478, Mar. 4, 1993, abandoned.

[51] Int. Cl.$^6$ ....................................................... H04B 1/38
[52] U.S. Cl. ................................ 455/90; 455/66; 455/575
[58] Field of Search ................................... 455/89, 66, 74, 455/90, 99, 345, 348, 349, 351, 550, 552, 553, 556, 557, 575; 379/58; 364/705.01, 705.05

[56] References Cited

U.S. PATENT DOCUMENTS

| | | |
|---|---|---|
| 3,806,650 | 4/1974 | Krone et al. . |
| 4,034,164 | 7/1977 | Westmoland . |
| 4,097,691 | 6/1978 | Ehrlich et al. . |
| 4,237,540 | 12/1980 | Sato ..................................... 364/705.05 |
| 4,396,941 | 8/1983 | Nishimura .......................... 364/705.05 |
| 4,591,661 | 5/1986 | Benedetto et al. . |
| 4,620,068 | 10/1986 | Wieder ................................. 179/156 A |
| 4,654,662 | 3/1987 | Van Orsdel ......................... 340/870.03 |
| 4,731,869 | 3/1988 | Farrer . |
| 4,747,122 | 5/1988 | Bhagat et al. . |
| 4,799,059 | 1/1989 | Grindahl et al. . |
| 4,847,818 | 7/1989 | Olsen . |

(List continued on next page.)

FOREIGN PATENT DOCUMENTS

| | | |
|---|---|---|
| 0 426 966 | 5/1991 | European Pat. Off. . |
| 0571125A1 | 11/1993 | European Pat. Off. . |
| 4136548C1 | 9/1992 | Germany . |
| 3-151731 | 6/1991 | Japan ..................................... 455/38.4 |
| A-2268032 | 12/1993 | United Kingdom . |
| A-2277841 | 11/1994 | United Kingdom . |
| WO90/03076 | 3/1990 | WIPO . |
| WO 94/21058 | 9/1994 | WIPO . |

OTHER PUBLICATIONS

"AT&T Paradyne Offers PCMCIA Modem For Nokia Portables", *Mobile Data Report*, Mar. 15, 1993, pp. 4–6.

*Primary Examiner*—Thanh Cong Le
*Attorney, Agent, or Firm*—Jenkens & Gilchrist, a Professional Corporation

[57] ABSTRACT

A modular telecommunications system for an electronic audio system being specially configured for wireless telecommunication in accordance with a preselected standard. Modular units are adapted to be secured within AM/FM radios, tape players, automobiles, and the like, for establishing a telecommunications link with a wireless network. The modular unit comprises a housing for mounting a telecommunications transceiver in the particular item of electronic audio systems, and a microphone or keyboard is provided for generating user communication signals. In this manner, electronic equipment may be purchased for its conventional, non-telecommunications use such as entertainment or commercial monitoring with the added flexibility of wireless telecommunications. A microphone and keypad are added to the electronic audio equipment for utilizing the functions of the telecommunications module. Modular units are adapted to be secured within AM/FM radios, tape players, automobiles, and the like for establishing a telecommunications link with a wireless network. The data received by the electronic module is displayed on the conventional display of the electronic audio equipment. A keypad is added to the electronic audio equipment for utilizing the functions of the telecommunications module and generating data signals for transmitting on the telecommunications module.

36 Claims, 9 Drawing Sheets

U.S. PATENT DOCUMENTS

| | | | |
|---|---|---|---|
| 4,870,676 | 9/1989 | Lewo . | |
| 4,881,258 | 11/1989 | Kaiwa et al. . | |
| 4,896,370 | 1/1990 | Kasparian et al. . | |
| 4,936,037 | 6/1990 | Holcomb et al. . | |
| 4,939,770 | 7/1990 | Makino . | |
| 4,940,976 | 7/1990 | Gastouniotis et al. . | |
| 4,972,457 | 11/1990 | O'Sullivan . | |
| 4,987,592 | 1/1991 | Flagg | 379/430 |
| 4,993,061 | 2/1991 | Hsieh . | |
| 5,018,051 | 5/1991 | Yamada et al. . | |
| 5,020,090 | 5/1991 | Morris . | |
| 5,028,806 | 7/1991 | Stewart et al. . | |
| 5,031,046 | 7/1991 | Bruggeman | 358/194.1 |
| 5,043,721 | 8/1991 | May | 340/825.44 |
| 5,050,138 | 9/1991 | Yamada et al. . | |
| 5,056,107 | 10/1991 | Johnson et al. . | |
| 5,056,153 | 10/1991 | Taniguchi et al. | 455/277.1 |
| 5,109,540 | 4/1992 | Dzung et al. . | |
| 5,113,428 | 5/1992 | Fitzgerald . | |
| 5,125,021 | 6/1992 | Lebowitz . | |
| 5,153,829 | 10/1992 | Furuya et al. . | |
| 5,157,247 | 10/1992 | Takahira . | |
| 5,161,803 | 11/1992 | Ohara . | |
| 5,183,404 | 2/1993 | Aldous et al. . | |
| 5,185,700 | 2/1993 | Bezos et al. . | |
| 5,189,632 | 2/1993 | Paajanen et al. . | |
| 5,194,860 | 3/1993 | Jones et al. . | |
| 5,197,092 | 3/1993 | Bamburak . | |
| 5,201,066 | 4/1993 | Kim . | |
| 5,202,838 | 4/1993 | Inoue . | |
| 5,202,913 | 4/1993 | Lang et al. . | |
| 5,203,021 | 4/1993 | Repplinger et al. . | |
| 5,233,646 | 8/1993 | Kuromi . | |
| 5,243,640 | 9/1993 | Hadley et al. . | |
| 5,251,232 | 10/1993 | Nonami . | |
| 5,260,989 | 11/1993 | Jenness et al. . | |
| 5,335,273 | 8/1994 | Takagi et al. . | |
| 5,335,276 | 8/1994 | Thompson et al. . | |
| 5,361,061 | 11/1994 | Mays et al. . | |
| 5,373,149 | 12/1994 | Rasmussen | 455/557 |
| 5,373,300 | 12/1994 | Jenness et al. . | |
| 5,418,836 | 5/1995 | Yazaki | 379/58 |
| 5,438,329 | 8/1995 | Gastouniotis et al. | 340/870.02 |
| 5,537,673 | 7/1996 | Nagashima et al. | 455/89 |
| 5,579,489 | 11/1996 | Dornier et al. | 455/89 |

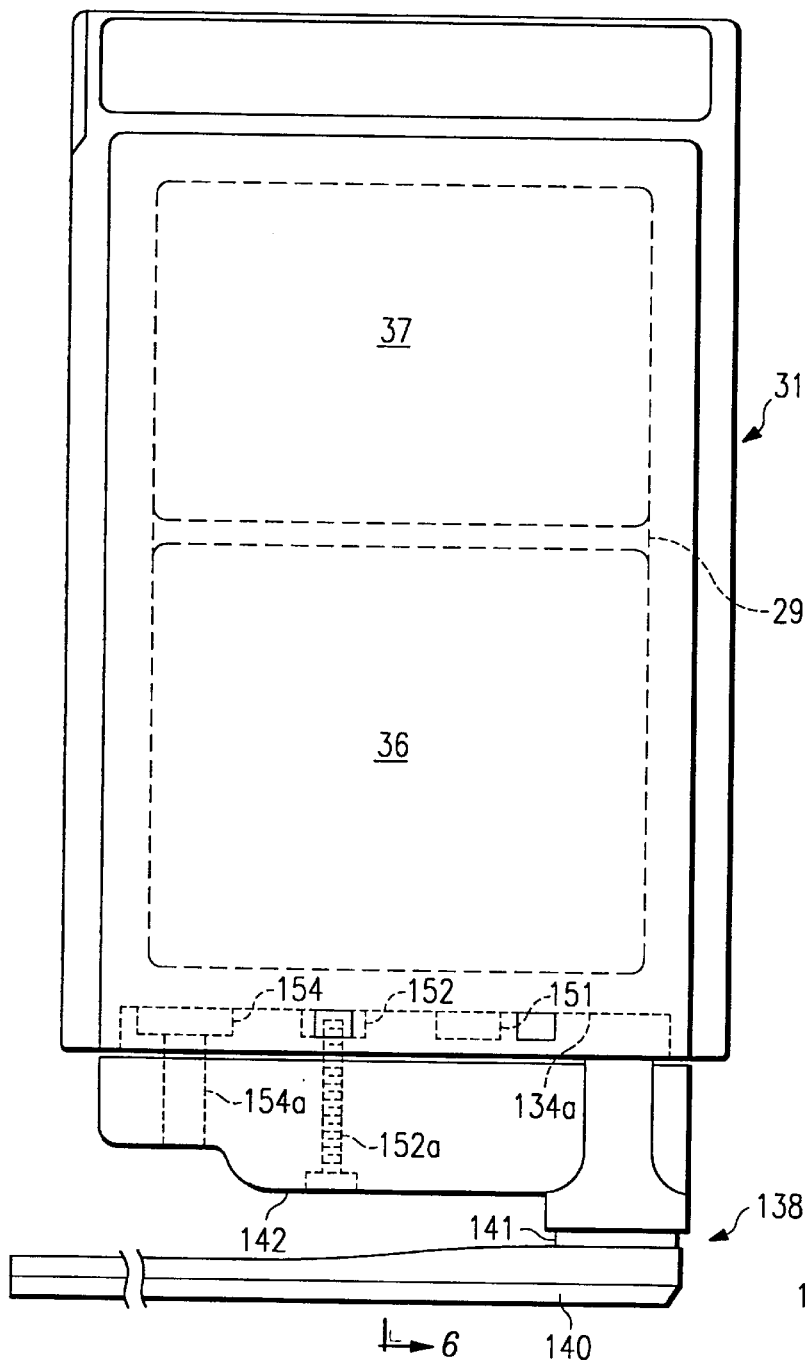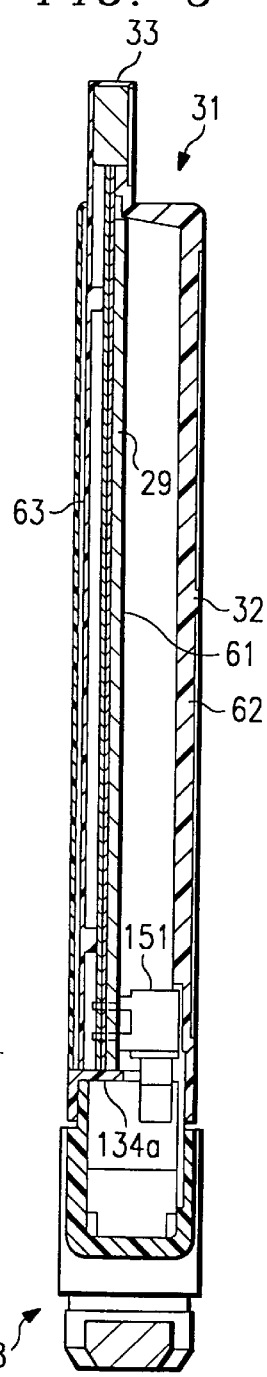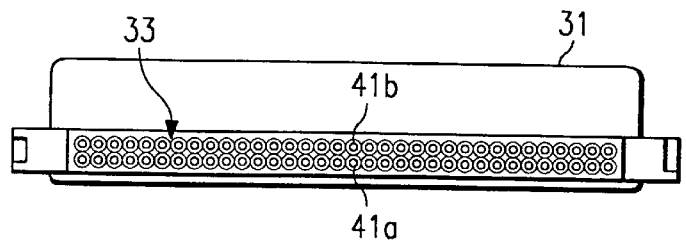

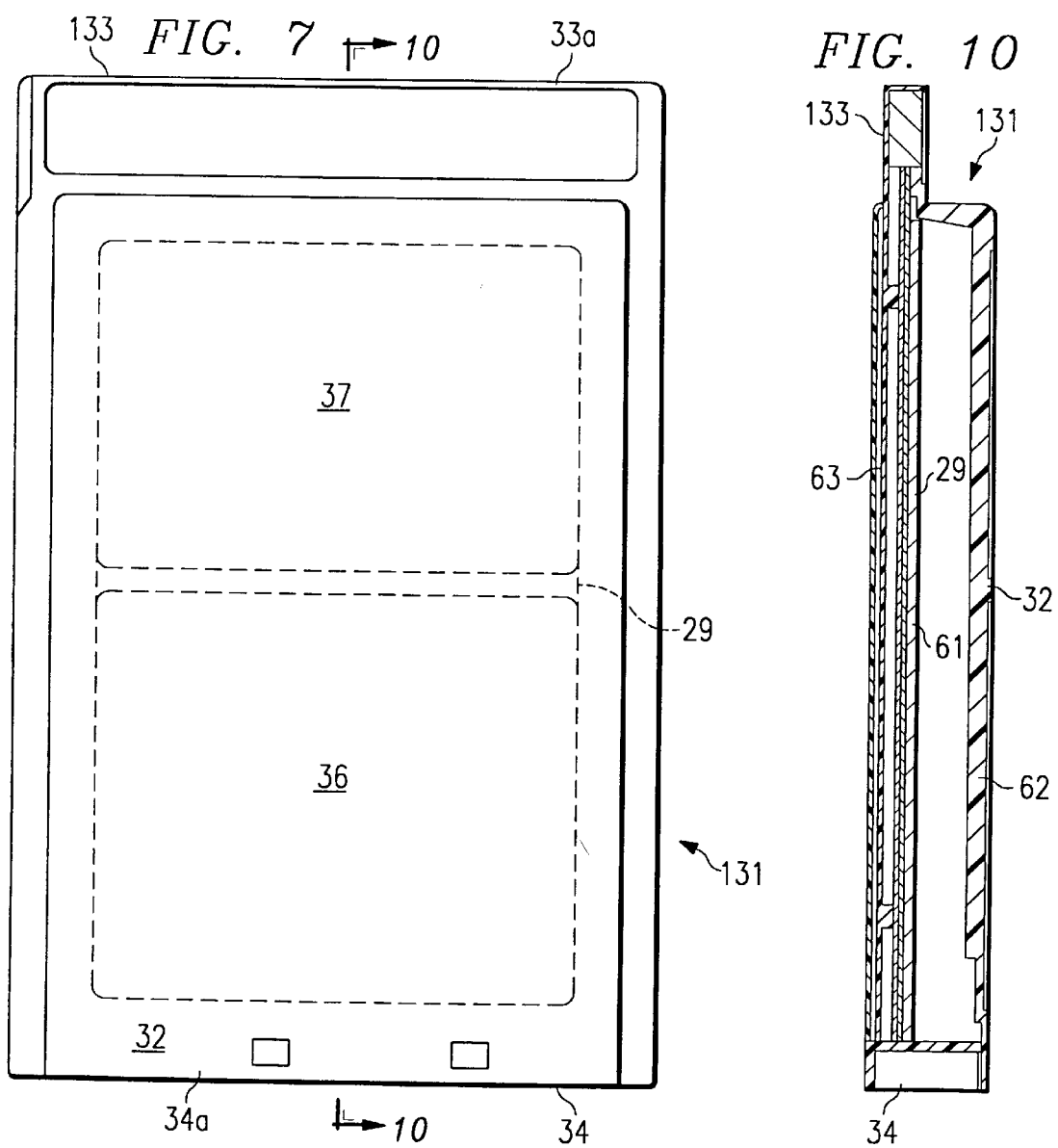

ELECTRONIC AUDIO SYSTEM CAPABLE OF COMMUNICATING DATA SIGNALS OVER WIRELESS NETWORKS

CROSS-REFERENCE TO RELATED APPLICATIONS

This application is a continuation-in-part of U.S. patent application Ser. No. 08/353,966 filed Dec. 12, 1994 entitled "Modular Radio Communications System" by inventor Per Stein, now U.S. Pat. No. 5,628,055; which is a continuation of U.S. patent application Ser. No. 08/026,478 filed Mar. 04, 1993 (now abandoned); which are assigned to the assignee of the present invention; and which are hereby incorporated herein in their entirety by this reference thereto.

BACKGROUND OF THE INVENTION

1. Field of the Invention

The present invention relates to electronic equipment and modular telecommunication systems and, more particularly, to a radio transceiver and/or modem for use in establishing a link to a wireless network for electronic equipment of the type not conventionally utilized for telecommunication.

2. Description of Related Art

The fields of consumer electronics, data processing and telecommunications have experienced marked technological advances in recent years. Personal stereo cassette, disc players, and automobile AM/FM radios have become smaller and more efficient as has related consumer electronic hardware. The great advances in memory chips and miniaturization techniques have also enabled more and more electronic systems to be packaged in smaller and smaller spaces. The same is true for industrial electronic equipment and for personal computers.

Like consumer electronic equipment in general, personal computers are manufactured by many different suppliers around the world. An entire industry has subsequently developed in supplying memory cards for enhancing the capacity of this wide variety of personal computers. Recently, there has been a movement toward standardizing the interconnection formats for use in circuit cards for personal computers. In particular, the PC and Memory Card International Association (PCMCIA) was formed with the goal of promoting the interchangeability of integrated circuit and memory cards among computer and other types of electronic products. Toward this end, the PCMCIA has promulgated certain physical and electrical standards to ensure that cards will be able to be used in different pieces of equipment. Both data storage, i.e. memory, and peripheral expansion, i.e. I/O, card types constructed in accordance with standards should be able to be used in any connectors also constructed in accordance with the standards. Such a standard is set forth in a variety of documents including the PCMCIA PC Card Standard, Release 2.0, incorporated by reference herein. The standard sets forth a 68 pin interchange for I/O type circuit cards for use in PC's.

Advances in wireless telecommunications have also moved rapidly in recent years. Various communication standards have been promulgated around the world defining specific frequencies, data rates, data formats, and the like for both voice and data communications by radio links between base stations and mobile units. For example, specialized packet switching systems for mobile data communications have enabled portable computers to directly uplink data access into the landline data communication network. Similarly, conventional voice based cellular radio systems, both analog and digital versions, can receive data from portable computers and transmit that data through the conventional telephone network to a remotely located data terminal. In addition, other systems such as paging (both local and global), DECT (Digital European Cordless Telecommunications), Mobitex, CDPD (Cellular Digital Packet Data), PCS (Personal Communications System) and the like have come into recent use. Each of these wireless telecommunications formats and standards generally requires separate software to provide a gateway for data into the wireless network as well as separate transmission/reception formats. This allows communication with radio base stations operating in different geographic areas as well as parts of different networks. It has been determined to be desirable, however, to package radio transceivers and/or modems in a modular manner so that a telecommunications terminal, such as a portable telephone or a portable personal computer, could be adapted for communication with different systems by simply replacing the modular unit with one which was especially configured for the telecommunications network with which communication was desired. The advantages of such radio transceiver packages should not, however, be limited to portable telephones and portable computers when other consumer and industrial electronic equipment can also be used with such packages.

The use of card mounted telecommunications interface equipment in a PC has existed for some time. In particular, modems are frequently mounted on an I/O card and plugged into receiving receptacles within the PC. The modem then enables the interface of a PC with standard telecommunication network lines and the transmission/reception of data for those lines. This is an extremely useful tool and maximizes the usefulness of the PC. Industrial and consumer electronic equipment, such as cassette and disc players have not yet been included in this technological integration with telecommunication to the extent of the PC.

It would be an advantage therefor to provide a standard PCMCIA card mounted radio transceiver which is readily replaceable in conventional consumer and industrial electronic equipment such as tape players, stereos, and utility meters to communicate with various networks in accordance with various radio standards. The system of the present invention and various components thereof provide such advantages.

SUMMARY OF THE INVENTION

In one aspect, the present invention includes the combination of an electronic audio system with a module port, a module, and a microphone. The electronic audio system includes at least one speaker and a radio receiver or a recording medium player, or both, which supplies audio signals to the speaker or speakers. The module port includes a module connector, and the module includes a housing with a first end and a system connector on the first end which is adapted for engaging the module connector. The module also includes a telecommunications transceiver which communicates with one of a plurality of standardized wireless networks and provides audio output signals to the speaker or speakers. The microphone provides audio input signals to the telecommunications transceiver of the module. In one embodiment, the module port and the module conform to a PCMCIA standard. In another embodiment, the electronic audio equipment includes a battery power supply which provides electrical power to the module. In yet another embodiment, an external power supply provides electrical power to the module. In another embodiment, the electronic audio equipment includes an antenna which is coupled to the module for use by the transceiver. In yet another embodiment, an antenna is coupled to the transceiver through a connector on the module housing. In another embodiment, the combination includes means for fading out the audio signals sent to the speaker, or speakers, and providing a signal indicating that an incoming call is available for receipt. In another embodiment, the combination includes a keypad for providing control signals to the telecommunications transceiver. In another embodiment, the microphone and speaker, or speakers, are combined into a headset which is coupled to the electronic audio system. In a further embodiment, the headset is coupled to the electronic audio system by a cable. In an alternate further embodiment, the headset is coupled to the electronic audio system by an infra red link. In another alternate embodiment, the headset is coupled to the electronic audio system by a radio link.

In another aspect, the invention includes the combination of an electronic audio system with a keypad, a module port, and a module. The electronic audio system includes a display, at least one speaker, and a radio receiver, or recording medium player, or both, which provides audio signal to the speaker, or speakers, and functional information to the display. The module port includes a module connector, and the module includes a housing with a first end and a system connector on the first end which is adapted for engaging the module connector. The module also includes a telecommunications transceiver for communicating data signals with one of a plurality of wireless networks and provides data signals to the display. The keypad provides data entry signals to the telecommunications transceiver. In one embodiment, the module port and the module conform to a PCMCIA standard. In another embodiment, the electronic audio equipment includes a battery power supply which provides electrical power to the module. In yet another embodiment, an external power supply provides electrical power to the module. In another embodiment, the electronic audio equipment includes an antenna which is coupled to the module for use by the transceiver. In yet another embodiment, an antenna is coupled to an the transceiver through a connector on the module housing. In another embodiment, the combination includes means for fading out the audio signals sent to the speaker or speakers and providing a signal indicating that an incoming call is available for receipt. In another embodiment, the keypad is a component of the electronic audio system. In another embodiment, the keypad is coupled to the electronic audio system by a cable. In another embodiment, the keypad is coupled to the electronic audio equipment by an infra red link. In another embodiment, the keypad is coupled to the electronic audio system by a radio link.

In yet another aspect, the invention includes a utility meter of the type having numeric information supplied to a display, combined with a module port having a module connector, and a telecommunications module having a housing, a system connector for engaging the module connector of the module port, and a telecommunications transceiver for communicating data signals with one of a plurality of standard wireless telecommunications networks. In a further embodiment, the module port and the module are of a PCMCIA standard. In another embodiment of the present invention, the utility meter includes an electrical power source and the telecommunications transceiver of the module receives power from the electrical power source of the utility meter. In yet another embodiment the module port and the module are of a PCMCIA standard, and the module connector and the system connector are modified from the PCMCIA standard to include power contacts for transmitting the electrical power from the power source of the utility meter to the telecommunications transceiver. In yet another embodiment of the present invention, the module includes a power connector not into the housing which receives power from an external power source for use by the telecommunications transceiver. In yet another embodiment of the present invention, an antenna is coupled with the telecommunications transceiver through the system connector of the module and the module connector of the module port. In yet another embodiment of the present invention, the module port and the module are of a PCMCIA standard, and the module connector and the system connector are modified from the PCMCIA standard to include at least one contact for coupling the antenna with the telecommunications transceiver. In yet another embodiment of the present invention, an antenna is coupled to the telecommunications transceiver through an antenna connector mounted to the housing of the module.

BRIEF DESCRIPTION OF THE DRAWINGS

For a more complete understanding of the present invention and for further objects and advantages thereof, reference may now be had to the following description taken in conjunction with accompanying drawings, in which:

FIG. 3 is a top plan view of an embodiment of a modular telecommunications unit constructed in accordance with the principles of the present invention and having a standard PCMCIA card interconnectivity format;

FIG. 4 is a front elevational view of the modular unit of FIG. 3 illustrating a standard PCMCIA card interconnectivity format;

FIG. 5 is a rear elevational view of the modular unit of FIG. 3 illustrating an external antenna mounted thereon;

FIG. 6 is a side elevational, cross-sectional view of the modular unit of FIG. 3 taken along the lines 6—6, illustrating the attachment of the antenna thereto;

FIG. 7 is a top plan view of another embodiment of a modular telecommunications unit constructed in accordance with the principles of the present invention and having a modified PCMCIA card interconnectivity format;

FIG. 10 is a side elevational, cross-sectional view of the modular unit of FIG. 7 taken along the lines 10—10 thereof.

DETAILED DESCRIPTION OF EMBODIMENTS

Figure 1:
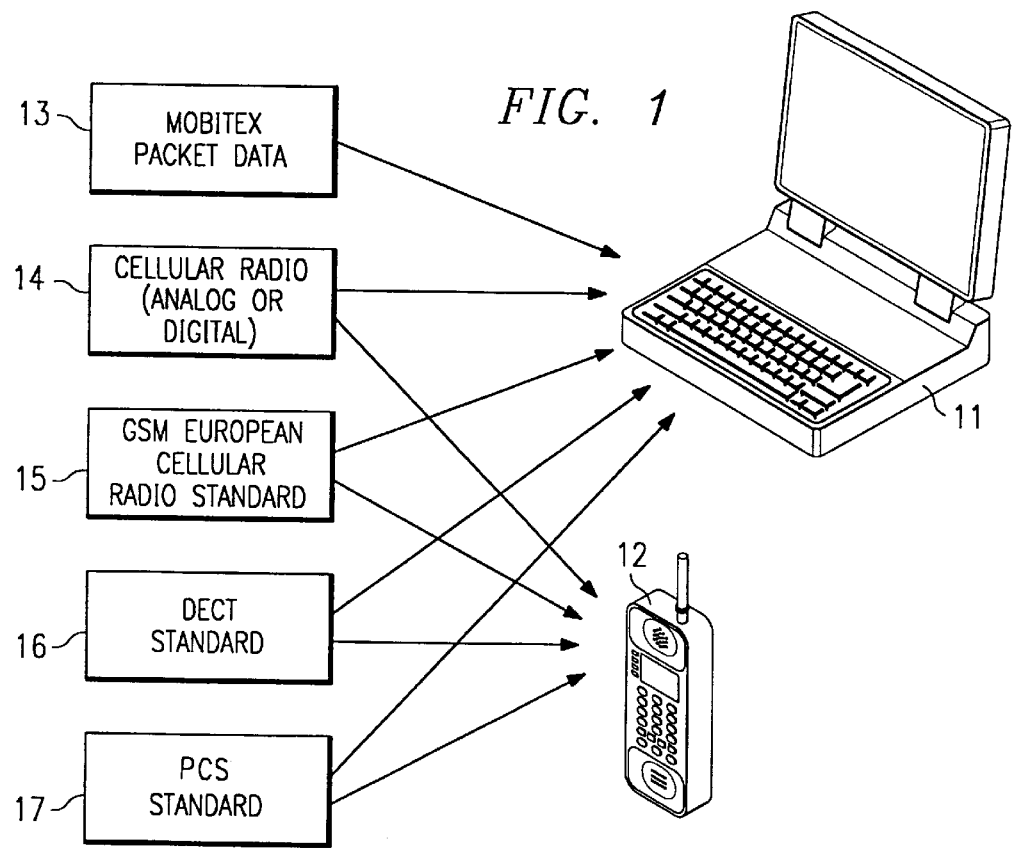
FIG. 1 is a block diagram illustrating an overall concept of telecommunications with electronic equipment.

Referring first to FIG. 1, there is shown portable communications devices in the form of a data processing unit, such as a laptop or notebook computer 11 and a portable telephone instrument 12. It is well established to allow the PC 11 and telephone 12 to communicate with various wireless telecommunication networks as most fully described in U.S. patent application Ser. No. 08/026,478 described above. Each of the telecommunication networks may, however, include different telecommunication standards and/or require modems of different types as represented diagrammatically in blocks 13–17. The various telecommunication standards may include, for example, AMPS, D-AMPS, JDC, TACS, GSM, NMT-450, NMT-900, DECT, Mobitex and future Spread Spectrum standards, as well as many more.

Still referring to FIG. 1, the portable telephone subscriber instrument 12 may include basic components for telecommunications with various wireless networks operating in accordance with numerous telecommunications standards. For example, should the telephone instrument 12 be needed for use in the United States, it must be capable of transmitting/receiving on a defined frequency band and in accordance with either the analog or digital modulation techniques in use in the United States. However, should the telephone instrument 12 be needed for communication with the wireless system which exists in the U.K. or Continental Europe, it would have to be capable of communicating on different frequencies and in accordance with somewhat different modulation techniques in order to be useful.

Referring still to FIG. 1, the laptop computer 11 may be needed for data communication with a number of different data networks which exist in a number of parts of the world. For example, a package switched data network exists in the Scandinavian and several European countries and in the United States and Canada which functions utilizing data packets of a prescribed size. The package switched data network is constructed in accordance with a prescribed protocol and provided as part of a service referred to by the trademark "MOBITEX" with which the assignee of the present invention is associated. Similarly, the laptop computer 11 may also be needed for communication with the United States cellular radio network (either in analog or digital format), with the European GSM digital cellular radio network, or the CDPD (Cellular Digital Package Data) network from time to time. Thus, the broad concept of the system of the present invention includes providing radio transceivers and/or modems 13–17 which are adapted for use in communication with the various networks in accordance with various standards used therein. Additionally, the term "transceiver" as used herein comprises appropriate radio control logic of the type necessary to make up a radio device that is capable of communicating with a wireless communication standard such as D-amps, GSM, etc. For example, the transceiver may include a transmitter, receiver, and when the communications device is used for data transmission, the transceiver may also incorporate data modem circuitry. As described in more detail below, a laptop computer 11 incorporates means for generating user communication signals in the form of its keyboard. Other items of electronic equipment particularly adapted for consumer entertainment use do not necessarily include signal generation means.

Still referring to FIG. 1, the modem 13 provides for radio communication with the MOBITEX packet data switched network, while modem 14 represents a modular unit which could be constructed to communicate with the conventional cellular radio network in the United States, either in analog or digital format. Similarly, the modem 15 might be adapted for radio communication with the European digital cellular radio network in accordance with the GSM standards adopted by the European Telecommunications Standards Institute (ETSI). Modem 16 could, likewise, permit telecommunications in accordance with the Digital European Cordless Telecommunications (DECT) standard. Other modems 17 can be used which permit communication on a paging network such as a local or a global paging system, communication on a PCS (Personal Communication System), or communication on any other like systems. The PCS may become the next generation of cellular systems combining wide area networks and on-site networks for both data and voice communication. Any of modems 14–17 might be useful within either the laptop computer 11 or the telephone subscriber instrument 12 while those units, as well as the MOBITEX data packet modem 13, could be used within the laptop computer 11. Moreover, the use of standard modems packaged in a modular form in standard sizes, would have great advantages in the future in providing flexibility within both voice and data telecommunication systems used throughout the world.

Figure 2:
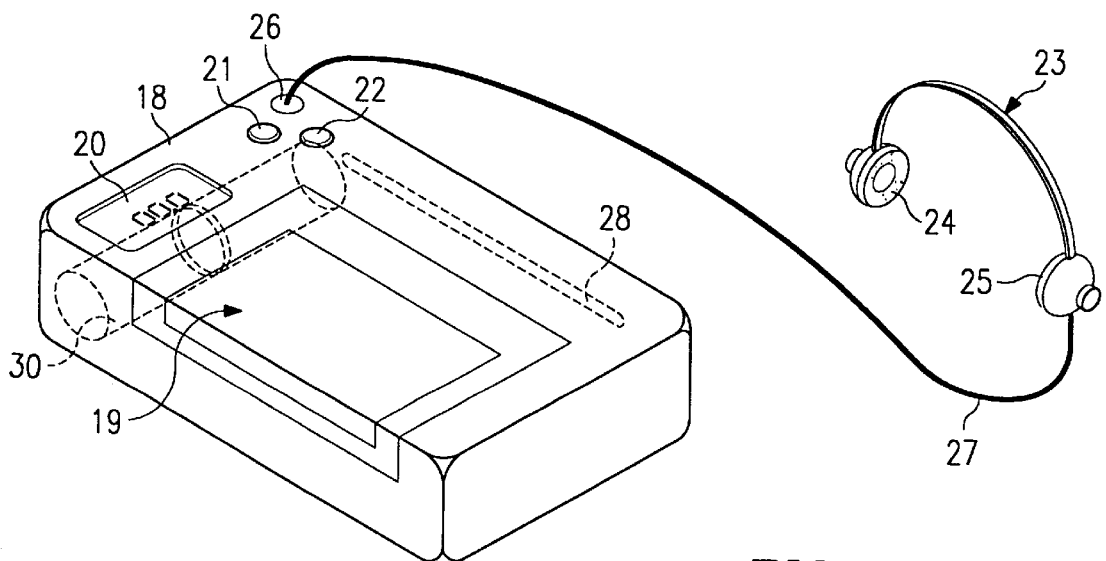
FIG. 2 is a diagram illustrating a prior art electronic audio system in the form of a personal radio/tape player.

Referring next to FIG. 2, there is shown an example of a conventional electronic audio system in the form of a conventional personal radio/tape player 18, which may be modified to utilize the principles of the present invention. Although the conventional electronic audio system depicted herein for modification according to the present invention is describe as a personal radio/tape player, it is to be understood that the reference to electronic audio systems is meant to encompass electronic audio systems having a radio receiver, or a recording medium player, or both. It is to be understood that a radio receiver encompasses electronic devices of the type not conventionally utilized for telecommunications which receive radio transmissions and converts those transmissions for audio playing, including devices such as an AM radio, a FM radio, an AM/FM radio, a television, a video tape recorder or a video cassette recorder (VCR), or the like. It is also to be understood that a recording medium player encompasses electronic devices of the type not conventionally utilized for telecommunications which play audio signals recorded on a medium, including devices such as a tape player, compact disk player, record player, a video tape recorder or a video cassette recorder (VCR), or the like. Furthermore, it is to be understood that a recording medium player includes electronic devices which are capable of recording audio signals on a recording medium. The personal radio/tape player 18 has a tape receiving compartment 19, a display 20, and controls 21 and 22. A headset 23, with speakers 24 and 25, is connected to a connection 26 in the personal radio/tape player 18 by a cable 27. The personal radio/tape player 18 also has an antenna 28 and a battery power source 30 disposed internally.

Referring now to the grouping of FIGS. 3–6 and 7–10, there are shown two versions of a telecommunications unit or module constructed in accordance with the principles of the present invention. FIGS. 3–6(group one) illustrate a telecommunications unit 31 which is constructed to conform with a standard PCMCIA card interconnectivity format embodied in connector 33. FIGS. 7–10 (group two) illustrate a unit 131 which is constructed with a modified connector 133 which does not comply with existing PCMCIA standards due to modifications in antenna and power connections discussed below. The modules 31 and 131 are constructed in accordance with, and having the attributes of, the teachings in U.S. patent application Ser. No. 08/026,478, filed Mar. 04, 1993, entitled "Modular Radio Communications System" by inventor Per Stein, and assigned to the assignee of the present invention, which is hereby specifically incorporated by reference. The modules 31 and 131 have also been designed to utilize the components of the host electronic equipment, as will be discussed below. Each version of the above-referenced telecommunications unit will now be discussed below.

Referring now to FIGS. 3–6, the group one version of the telecommunications unit outlined above, and in particular to FIG. 3 there is shown a top plan view of the modular unit 31. A radio transceiver 36 and modem 37 are shown in the modular unit 31 by dotted lines, which also define the telecommunications card 29. The modular unit 31 also has a mounting member 152 and connectors 151 and 154 which are also represented by dotted lines. The connector 151 comprises a coaxial antenna coupling which is plugged into the antenna 138. The particular modular antenna structure of FIG. 3 includes an antenna bar 140, which is pivotally mounted through pivot antenna mount 141 to rotate about a base structure 142. Base 142 is coupled to the module 31 with a conventional fastener, such as a threaded member 152a shown in dotted lines engaging mounting member 152. Antenna connector 151 is also shown by dotted lines to illustrate a conventional coaxial connection thereto from antenna 140. The antenna 140 may then be rotated into the most appropriate position for maximizing effectiveness of use. Rotatable antennas are, of course, conventional in this technological area. The use, however, of such a modular antenna on a modular housing 31, adapted for the applications described herein, is a marked advance over the prior art. Power connector 154 is also shown by dotted lines in registry with access aperture 154a, which will be discussed below.

Referring now to FIG. 4 there is shown a front elevational view of the modular unit 31 of FIG. 3, illustrating more clearly the multipin connector 33. The multipin connector 33 is constructed in accordance with the current standard PCM-CIA card interconnectivity format. The contacts of multipin connector 33 are connected to the circuitry within the telecommunications card 29. The connector 33 comprises a pair of rows of contacts 41a and 41b. No separate power or antenna connectors are shown herein due to the fact that this particular contact configuration conforms with the existing PCMCIA standard and the antenna and power connectors are presented in the rear portion 134a of module 31 as described herein.

Referring now to FIG. 5 there is shown a rear elevational view of a modular telecommunications unit constructed in accordance with the principles of the present invention. In this embodiment, the modular unit 31 includes a rear portion 134a having a recess 134 wherein coaxial connector 151 is secured adjacent a mounting member 152 such as a threaded coupling. The coaxial connector 151 is mounted for use in coupling the radio transceiver 36 within the module 31 to an antenna disposed either internally or externally of the particular electronic equipment in which the unit 31 is connected. When an antenna is mounted directly to the module 31, mounting member 152 provides a means for securement of the antenna structure to module 31, as will be described in more detail below. A connector 154 is also shown. Connector 154 enables coupling of external power to the telecommunications card 29 within the module 31.

Referring now to FIG. 6 there is shown a side elevational, cross-sectional view of the modular unit 31 of FIG. 3 taken along lines 6—6 thereof. As shown in FIG. 6, the module 31 includes a telecommunications card 29 comprising a printed circuit board 61 onto the surface of which various printed circuit card traces may be formed and various components may be mounted to comprise a radio transceiver and modem secured within the module 31. The circuitry on board 61 is selectively connected to the terminals of connector 33 to couple signals into and out of the circuitry within the module. An upper shell 62 covers the upper portion of the components mounted on the printed circuit board 61 while a lower shell 63 covers the lower surface of the board and mates with upper shell 62 to form an enclosed unit 31. In this particular view an internal portion of coaxial connector 151 is shown mounted to board 61 and projecting through rear portion 134a to connect with modular antenna 138. The construction of modular antenna 38 is as described above in connection with FIG. 3.

Referring now to FIGS. 7–10, the group two version of the telecommunication unit outlined above, there is shown in FIG. 7 a top plan view of a modular telecommunications unit 131 constructed to conform with a standard PCMCIA card interconnectivity format. In particular, the modular unit 131 includes an outer shell 32 which is generally flat and has located at a first end 33a a multipin connector 133 (seen most clearly in FIG. 8) having a plurality of individual contacts for engagement with a mating connector located within an item of electronic equipment, such as a tape player. It should be noted that although a tape player is referred to, a variety of consumer or industrial electronic equipment could be addressed and modified in accordance with the principles of the present invention to provide modular telecommunications therefrom. In that regard, the opposite end 34a of the modular unit 131 includes a recessed region 34 where external power and antenna connectors may be mounted, as described above with regard to FIGS. 3, 5, and 6.

Still referring to FIG. 7, as shown by dotted lines extending thereacross, the module 131 houses a telecommunications card 29 including a radio transceiver 36, which may include a modem section 37. The card 29 is shown by dotted lines as are transceiver and modem sections 36 and 37. Power, controls, antenna, speakers, and microphone are coupled into the card 29 through selected contacts from the multipin connector 133, describe in more detail below.

Figure 8:
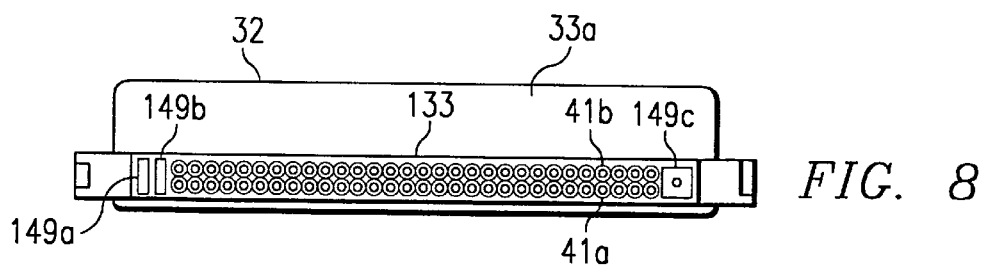
FIG. 8 is a front elevational view of the modular unit shown in FIG. 7 illustrating the pin connections thereto.

Referring now to FIG. 8, there is shown a front elevational view of the modular unit 131 of FIG. 7, illustrating more clearly the multipin connector 133. The contacts of multipin connector 133 are connected to circuitry within the telecommunications card 29. The connector 133 comprises a pair of rows of contacts 41a and 41b constructed in accordance with the standard PCMCIA format. In the system of the present invention, certain areas of the contact array have been modified and the contacts provided in a different configuration and/or format to allow connection to an antenna and/or power source for transmission of increased amounts of power into the circuitry of the card 29. Such connection may be necessary when the power requirements of the transceiver 36 (and/or modem 37) cannot be adequately handled by the normal signal carrying contacts 41a–41b. Contacts 149a and 149b are thus shown to illustrate such a modified power pin configuration. Connector 149c illustrates an antenna coupling. It should be noted that other antenna and power connections may be provided in accordance with the principles of the present invention and another specific embodiment is described below.

Figure 9:
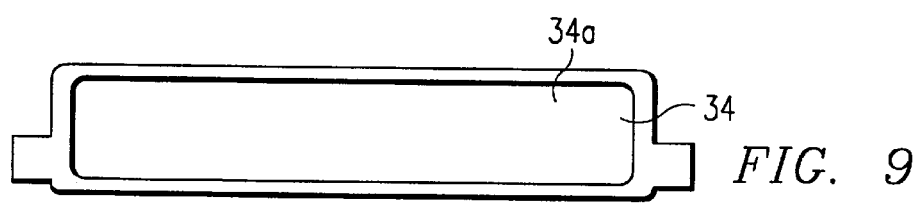
FIG. 9 is a rear elevational view of the modular unit of FIG. 7 illustrating one embodiment thereof with no antenna or power connector thereon.

Referring now to FIG. 9, the end 34a is formed with a recess 34 wherein other connectors may be mounted for use in coupling the radio transceiver 36 and modem 37 within the module 131 to an external antenna. However, with the antenna connector 149c and power connectors 149a and 149b provided along connector 133, such external connectors are not necessary along the opposite end in recess 34. For this reason, no connectors are shown in this particular embodiment.

Referring now to FIG. 10, there is shown a side elevational, cross sectional view of the module 131. As most clearly shown in this view, the telecommunications card 29 of module 131 includes a printed circuit board 61 onto the surface of which various printed circuit card traces may be formed and various components for example, ASICs (Application Specific Integrated Circuits) may be mounted to comprise the radio transceiver and modem secured within the module 131. The circuitry on the board 61 is selectively connected to the terminals 41a–41b on the connector 133 to couple signals into and out of the circuitry within said module. An upper shell 62 covers the upper portion of the components mounted on the board 61 while a lower shell 63 covers the lower surface of the board and mates with the upper shell 62 to form an enclosed modular unit.

Figure 11:
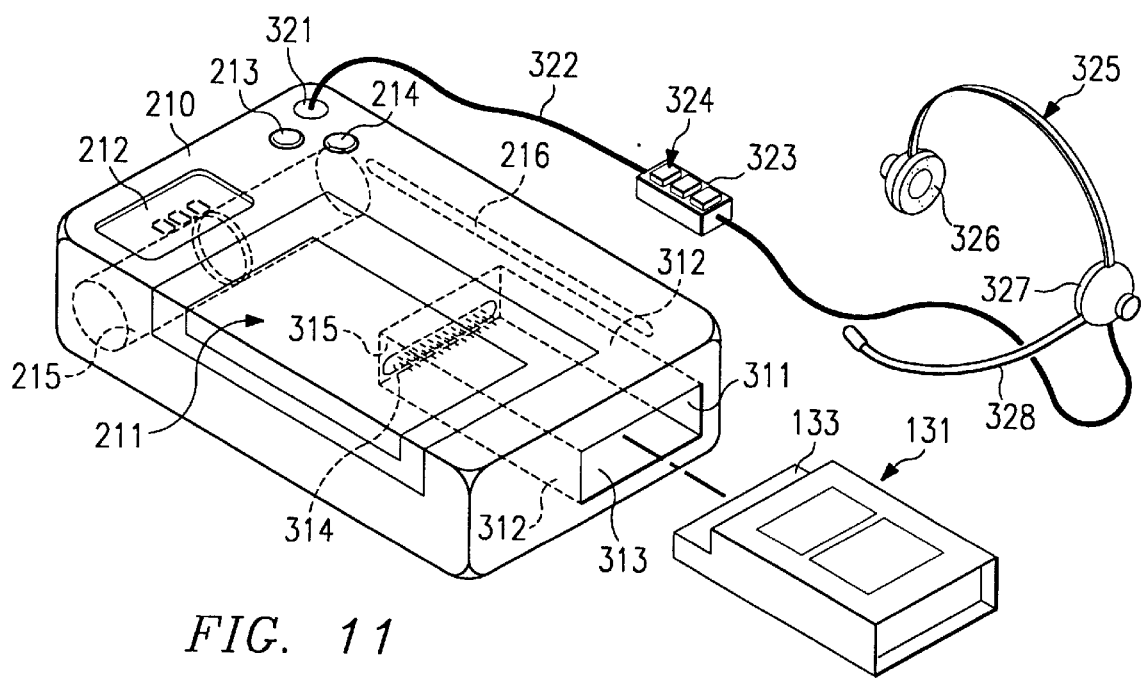
FIG. 11 is an exploded, perspective view of a modular unit of the type shown in FIG. 7 in association with a module receiving slot in an electronic audio system in the form of a personal radio/tape player.

Referring now to FIG. 11 there is shown a conventional electronic audio system, in the form of a conventional personal radio/tape player which has been modified as an embodiment of the present invention, illustrated as a personal radio/tape player 210. The tape player 210 shown herein includes a conventional tape receiving compartment 211, a display panel 212, and operation control knobs 213 and 214. The personal radio/tape player 210 also includes a conventional battery power source 215 and a conventional antenna 216.

Still referring to FIG. 11, the personal radio/tape player 210 includes a mounting slot 311 for the installation of the modular unit 131. The mounting slot 311 is particularly adapted for receipt of and connection to module 131. The slot 311 is constructed with side walls 312 and a frontal opening 313. A mating connector 314 is disposed along end 315 for mating connection with connector 133 of the module 131. The battery power supply 215, antenna 216, and the display 212 in the personal radio/tape player 210 are connected to the module 131 through the connector 314 and the connector 133.

Referring still to FIG. 11, a conventional personal radio/tape player will generally also include electronic circuitry for interconnecting an earphone. In one construction the tape player 210 may be of conventional design which has been modified for both head phones 326 and 327, and a microphone 328 in a headset 325. Both of the head phones 326 and 327, and the microphone 328 can then be utilized through a connector cord 322 of headset 325 for connection with the tape player 210. The headset 325, as shown herein, also includes a remote control panel or keypad 323 having a control button array 324 for generating the necessary control signals for the telecommunication functions of the module 131. A connector cord 322 interconnects a connector 321 of tape player 210 to the headset 325. The head phones 326 and 327, the microphone 328, and the keypad 323 connect with connector 133 of the module 131 through the connector 321 and the connector 314.

Figure 12:
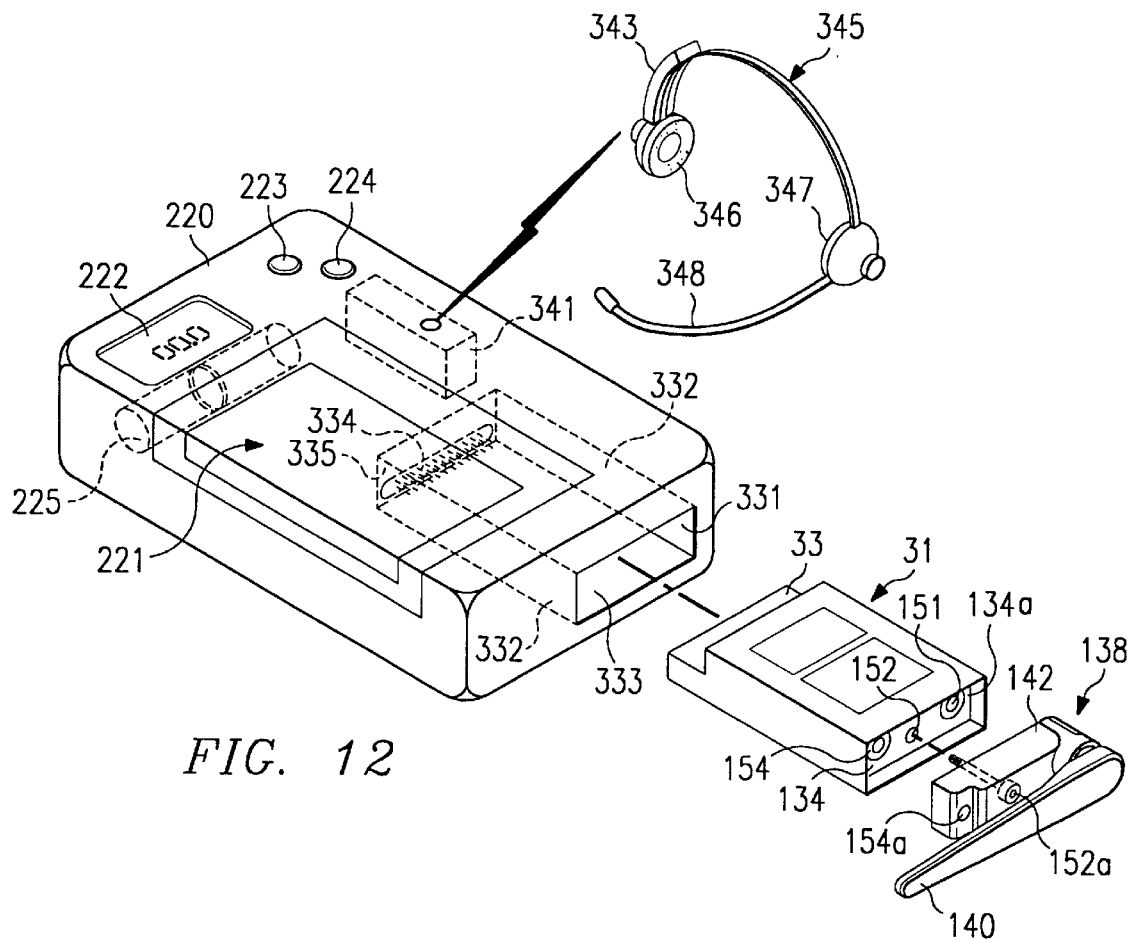
FIG. 12 is an exploded, perspective view of a modular unit of the type shown in FIG. 3 in association with a module receiving slot in an electronic audio system in the form of a personal radio/tape player.

Referring now to FIG. 12, there is shown a personal radio/tape player 220 according to another embodiment of the present invention. Similar to the personal radio/tape player 210 in FIG. 11, the personal radio/tape player 220 has a conventional tape receiving compartment 221, a display panel 222, and operation control knobs 223 and 224. The personal radio/tape player 220 also includes a conventional battery power source 225 disposed internally.

Still referring to FIG. 12, the personal radio/tape player 220 includes a mounting slot 331 for the installation of the modular unit 31. The mounting slot 331 is particularly adapted for receipt of and connection to module 31. The slot 331 is constructed with side walls 332 and a frontal opening 333. A mating connector 334 is disposed along end 335 for mating connection with connector 33. The battery power supply 225 and the display 222 in the personal radio/tape player 220 are connected to the module 31 through the connector 334 and the connector 33. The modular antenna structure 138 (described above) is also shown in position for mounting to the end 134a of unit 31. Connecting end 134a thus includes recess 134 which houses connectors 151 and 154. Connector 151 is preferably a coaxial connector adapted for coupling to antenna 138, while connector 154 is constructed for connecting external power (if necessary) to the modular unit 31 through aperture 154a found in antenna base structure 142. In that regard, an AC/DC power supply (not shown) can provide external power to the module 31 from an external source.

Still referring to FIG. 12, the conventional tape player is also modified to have a transmitter/receiver infra red or "short range" radio link 341. In one construction, a headset 345 has a transmitter/receiver 343 which is adapted for 2-way communication with the link 341 built into the tape player 220. The headset 345 includes earphones 346 and 347, and a microphone 348 extending from the earphone 347. The earphones 346 and 347, and the microphone 348, are coupled to the link 341 in the tape player 220 through the transmitter/receiver 343 of the headset 345. In one embodiment, the transmitter/receiver 343 of the headset 345 also includes a keypad or control panel (not shown) which is coupled to the link 341. The earphones 346 and 347, the microphone 348, and the keypad (not shown) of the headset 345 connect with connector 33 of the module 31 through the headset transmitter/receiver 343, the link 341, and the connector 334.

Referring now to FIGS. 11 and 12, although the module port has been described as having walls and an open end, the module port can also be only a connector for receiving the module. It should be noted that a headset, containing an earphone and/or a transmitter/receiver is a conventional article in the art of communication technology, but is not typically utilized with a conventional personal radio/tape player. A headset having a single or a pair of earplugs is typical for the conventional personal radio/tape player. The incorporation of the microphone, while conventional in other telecommunication equipment, is necessary in the present invention for consumer signal generation and two-way voice communication. Furthermore, the discovery of the combination of a telecommunications transceiver module with an electronic audio system having radio receiver, recording medium player, or both, is considered to be a part of the present invention.

Figure 13:
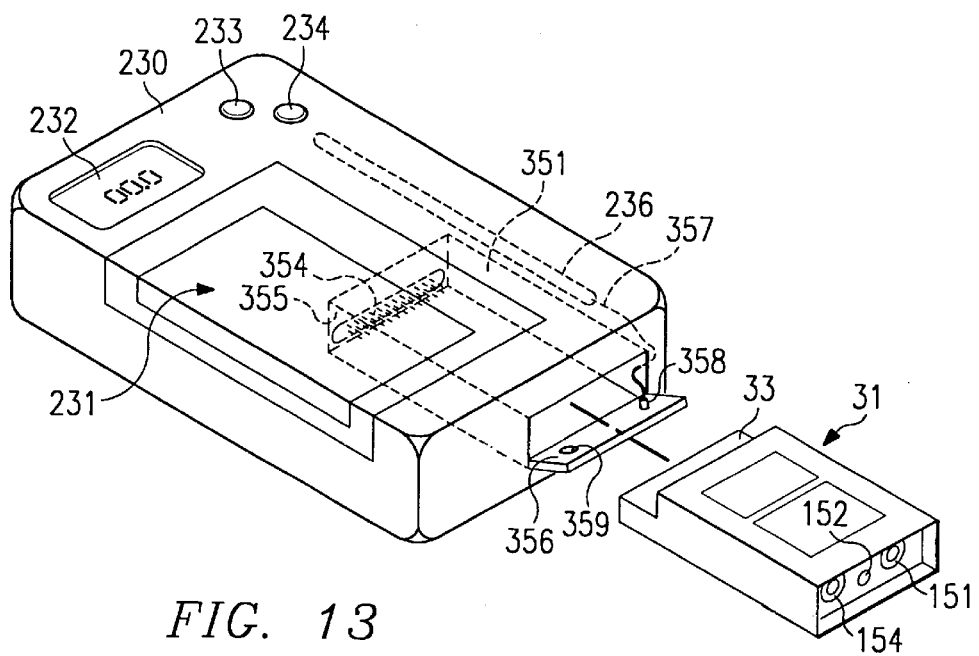
FIG. 13 is an exploded, perspective view of a modular unit of the type shown in FIG. 3 in association with a module receiving slot in an electronic audio system in the form of a personal radio/tape player.

Referring now to FIG. 13 there is shown an alternative mounting of the modular unit 31 of FIG. 3 and an alternative personal radio/tape player 230. As described above, connector 33 of module 31 is shown to matingly connect with slot connector 354 disposed on end 355 of slot 351. In this particular view, the modular unit 31 is being installed in a tape player 230 constructed with a flap 356. The flap 356 is provided in a configuration for closure over the unit 31 and direct coupling with coaxial connector 151, while continuing to expose external power connector 154. In this embodiment, an internal/external antenna 236 is specifically shown within the tape player 230, as is conventional for tape player/radio combinations. Consumer AM/FM radios require an antenna which may be solely internal or partially retractable into the tape player 230 when the AM/FM radio is not being used. The antenna 236 (shown in phantom) is connected by a cable 357 (partly shown in phantom) to flap connector pin 358 of flap 356. Aperture 359 is positioned in flap 356 for alignment with power connector 154 of module 31 and sized to facilitate receipt of, and connection into connector 154, of a plug from and external power source (not shown). In an alternative embodiment, not specifically shown, an internal power supply from the tape player 230 may be connected to the connector 154 of module 31 by coupling to a power connection pin disposed on the flap 356 in place of the aperture 359.

Referring still to FIG. 13, the headset and control panel of FIGS. 11 or 12 are not shown in this particular view for purposes of clarity. The tape player 230 does, however, include a tape installation slot 231, a display screen 232, operation control knobs 233 and 234, as well as the antenna 236. Electronic audio systems, such as the personal radio/tape player 230, are constructed in a variety of configurations. Although only a single equipment configuration is shown herein (showing particular amenities such as display screen 232), this is not meant to limit in any way the type of electronic audio system that may be utilized in accordance with the principles of the present invention.

Figure 14:
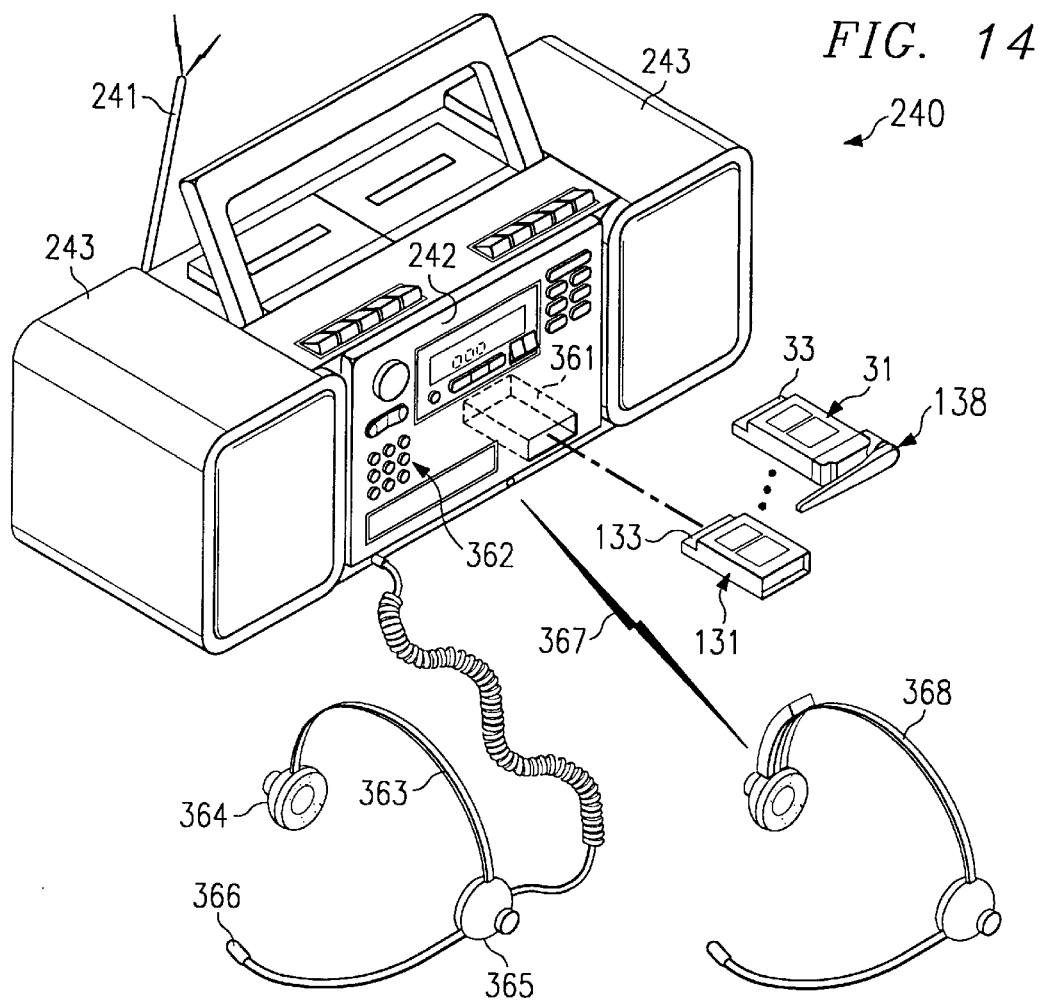
FIG. 14 is an exploded, perspective view of a modular unit of the type shown in FIG. 3 or FIG. 7, in association with a module receiving slot in an electronic audio system in the form of a Portable Tape Player-Am/Fm Radio.

Referring now to FIG. 14 there is shown an illustration of another item of electronic audio systems in the form of a portable tape player-AM/FM Radio which is of the conventional type of portable radio that has been modified for utilizing a modular telecommunications unit. Also shown is the versatility and multiple uses possible with the modular units 31 and 131 of the present invention. As stated above, either module 31 or 131 may be used in such applications. As previously stated, the modular units 31 and 131 provide a telecommunication technology capability to the host equipment. However, several technologies may, in fact, reside on a single card within the modular units 31 and 131.

Still referring to FIG. 14, the tape player/radio 240 is of the conventional type tape player-radio which has been modified to utilize the telecommunications functions of either module 31 or module 131. The tape player-radio 240 has the conventional features of an antenna 241, a display 242, speakers 243, and an internal power source (not shown). The tape player-radio 240 also has connections to headphone (not shown) which have been modified for using a headset 363 or 368 as will be described below. One of the modifications to the conventional type tape player-radio for the present invention is the addition of the slot 361 adapted to receive and electrically connect with one of the module 31 or the module 131. A keypad 362 has also been added to the conventional tape player-radio so that a user can control the telecommunications functions of either the module 31 or 131.

Still referring to FIG. 14, one of the modules 31 or 131 is received in the slot 361 in the tape player-radio 240. The module 31 or 131 utilizes the antenna 241 and the display 242 which are the conventional elements of the tape player-radio 240. The functions of the telecommunications module 31 or 131 are operated by the keypad 362. Voice communication of the telecommunications function is accomplished with the headphones 364 and 365, and the microphone 366 of the headset 363. Alternatively, the conventional tape player-radio can be modified with an infra red or "short range" radio link 367 to a headset 368.

Referring now to FIGS. 11, 12, 13, and 14, although the illustrated embodiments disclose the telecommunication features being located in the consumer electronic audio systems, e.g. the personal radio/tape players 210, 220, 230, and the portable tape player-Am/Fm Radio 240, in another construction, the telecommunications electronics from the module 31 or the module 131 are integrated into the consumer electronic audio system, instead of being a separate detachable module such as module 31 or module 131. In another construction of the present invention, the keypad for operating the telecommunication functions of the module 31 or the module 131, are located on the consumer electronic audio system, such as the personal raido/tape players 210, 220, 230, or the portable tape player-Am/Fm radio 240. It should also be noted that the module 31 and the module 131 can be any analog or digital technology.

Figure 15:
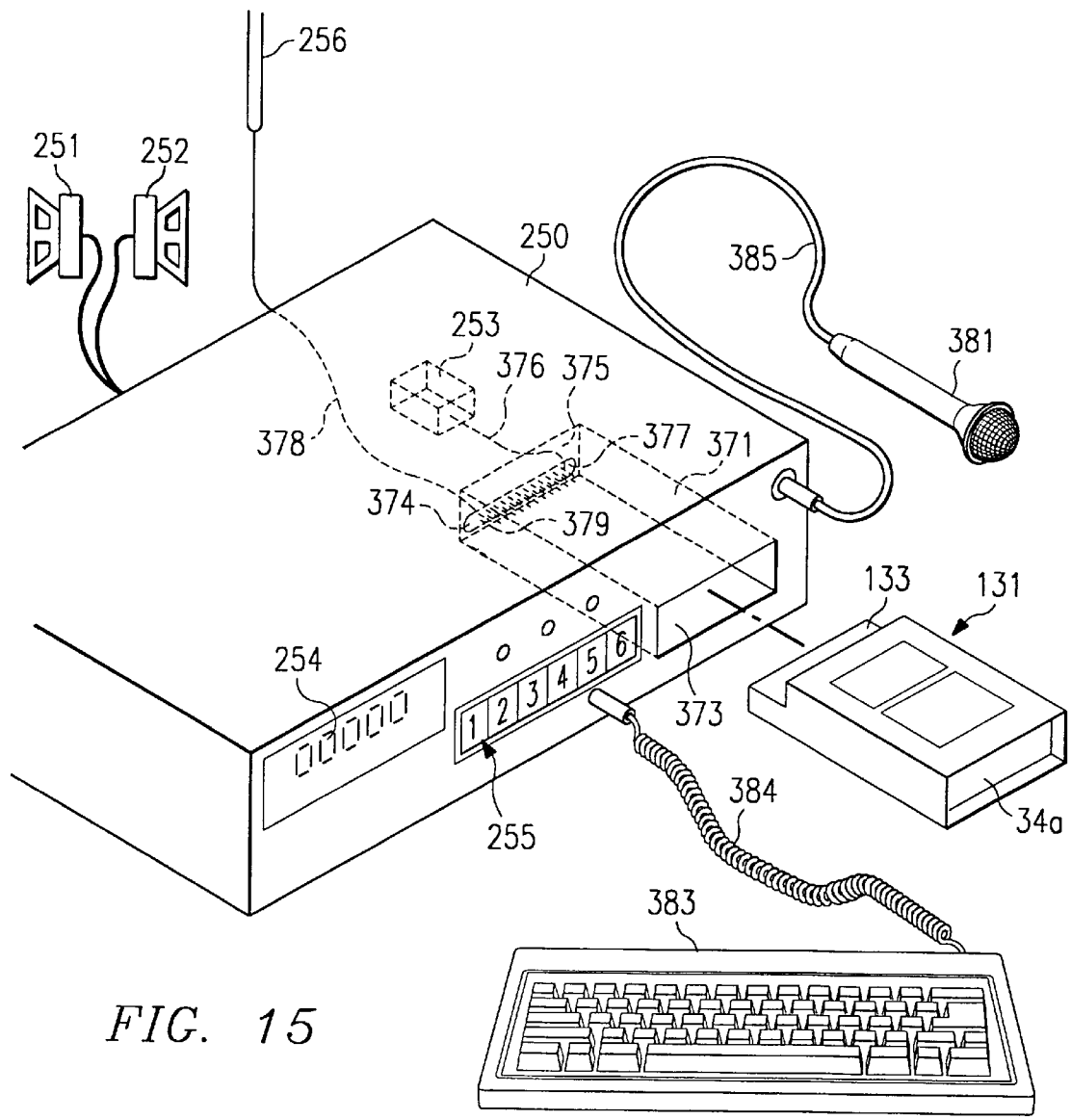
FIG. 15 is an exploded, perspective view of the modular unit of FIG. 7 being inserted in an electronic audio system in the form of an Automobile AM/FM/Tape Player Stereo.

Referring now to FIG. 15, there is shown the installation of the modular unit 131 of FIG. 7 into an automobile AM/FM/tape player stereo 250. Stereo 250 is a conventional type automobile stereo which has been modified in design to include a mounting slot 371 for receipt of module 131. As stated above, this is a modification to the standard PCMCIA and interconnectivity format. It should be noted that modular unit 31 could have been chosen for discussion purposes in view of the fact that both modular units 31 and 131 are equally functional for this application. A conventional car stereo has thus been modified in design to the automobile AM/FM/tape player stereo 250 which specifically accommodates the unit 131 and the advantages thereof. Stereo 250 could also be modified to specifically accommodate the unit 31 and the advantages thereof.

Still referring to FIG. 15, the car stereo 250 has the standard car stereo components of speakers 251 and 252, a display 254, and a keypad 255. The speakers 251 and 252, the display 254, and the keypad 255 are connected to the connector 133 of the module 131 through the connector 374. The car stereo 250 also has an antenna 256, and a power supply 253 (shown by dotted lines). The power supply 253 is connected by the power supply line 376 to pins 375 and 377 of specially adapted connector 374, which are positioned in registry with, and mating engagement of, the appropriate power connecting contacts 149a or 149b (shown in FIG. 4). Likewise antenna cable 378 is shown by a dotted line to connect pin 379 of connector 374, which is positioned in registry with, and mating engagement for antenna connector 149c (shown in FIG. 4). It may be seen in this particular embodiment that the advantages of both the communications antenna and the additional power supply are provided without the need for external connections from end 34a. The module 131 can simply be plugged into slot opening 373, whereby connector 133 mates with connector 374, and the telecommunication system becomes operational.

Still referring to FIG. 15, as noted above, the stereo 250 can be a conventional type automobile stereo which has been modified for including the modular telecommunication capabilities described herein. The stereo 250 is constructed with conventional speakers 251 and 252. Speakers are conventional in AM/FM radios for providing the intended sound. The unit function and tuning of the stereo 250 is indicated by display 254 with the control panel 255 providing means for such tuning and related AM/FM radio functions. What is not conventional is the utilization of a modular unit 131 (or 31 as above discussed), in conjunction with a conventional automobile stereo, as set forth above, to provide both entertainment and telecommunication functions. Likewise, the incorporation of a microphone 381 may not be conventional with automotive stereos but is utilized herewith for purposes of affording a user means to generate telecommunication signals within such equipment. A separate keypad or keyboard 383 is shown herein for utilization in operating the telecommunications functions of the module 31. The keyboard 383 is connected to the stereo 250 by connector cord 384, while microphone 381 is connected to the stereo 250 by cable 385. Either, or both, of the keyboard 383 and microphone 381 may be utilized, and the display panel 254 is likewise available for indicating the signal actuation thereof. In one construction, the present invention utilizes the control panel 255, which operates the conventional features of the car stereo 250, to operate the telecommunications functions of the module 31.

Referring still to FIG. 15, consistent with the principles of the present invention, the electronic audio equipment, such as the automotive stereo 250, are completely functional in its conventional capacity as a stereo, tape player or the like, while the addition of the modular unit 131 provides the added advantages of telecommunications therefrom. For obvious reasons, modifications will have to be made to the particular electronic audio equipment for not only receiving the modular unit 131, but also for generating user communication signals therewith. In one construction of the present invention, the module 131 (or module 31) is a voiced based telecommunications module providing digital or analog cellular technology to the car stereo 250. In another construction of the present invention, the module 131 (or module 31) is a data communications card (such as Mobitex or paging format) which receives messages on the display 254, and uses either the keypad 255 or the keyboard 383 for acknowledgment and data entry. If more display area is necessary, a larger display can be added to the car stereo 250, similar to adding the keyboard 383. The modules 31 or 131 are to be modified to contain the correct software for rerouting the messages to the display 254.

Figure 16:
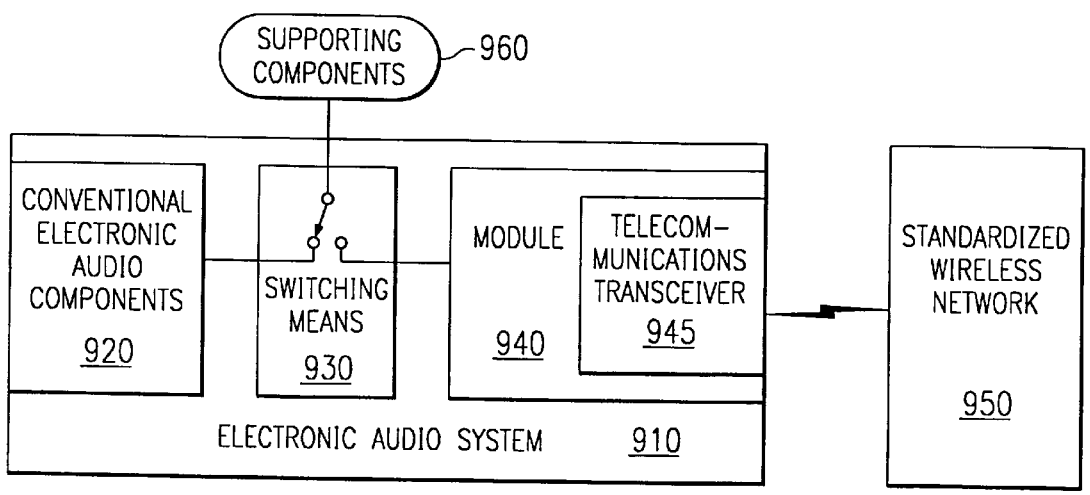
FIG. 16 is a block diagram illustrating a switching aspect of one embodiment of the present invention.

Referring now to FIG. 16, there is shown a block diaphragm illustrating a switching aspect of one embodiment of the present invention. The electronic audio system 910 contains conventional electronic audio components 920, such as a radio receiver, or a recording medium player, or both. The conventional electronic audio components 920 are connected to a switching means 930. A module 940 having a telecommunications transceiver 945 is also connected to the switching means 930. The telecommunications transceiver 945 of the module 940 is adapted for communicating with at least one of a plurality of standardized wireless networks 950 in accordance with at least one pre-selected communication standard.

Still referring to FIG. 16, the switching means 930 is connected to the supporting components 960. The supporting components 960 are conventional supporting electronic components for the conventional electronic audio components 920, new supporting electronic components, or both, which are necessary to support the telecommunications functions of the module 940. The supporting components 960 can include, but are not limited to, speakers, microphones, headsets, keypads, keyboards, monitors, electrical power sources, or the like. Furthermore, some or all of the supporting components 960 can be located internally to the electronic audio system 910, externally to the electronic audio system 910, or both.

Referring still to FIG. 16, the switching means 930 switches connection of the supporting components 960 between the conventional electronic audio components 920 and the module 940. In one embodiment, the switching means 930, is a conventional manual switch. In another embodiment, the switching means 930 is a device utilizing hands free technology phone answering. Examples of hands free technology phone answering are illustrated by U.S. Pat. No. 4,591,661 titled "Portable Cordless Telephone—Radio Receiver" and issued to Benedetto et al. May 27, 1986, and U.S. Pat. No. 4,993,061 titled "Portable Miniature High Fidelity Stereo Tape Player and Cordless Radio Telephone System" and issued to Hsieh on Feb. 12, 1991, both of which are hereby specifically incorporated by reference. Although hands-free technology, phone answering may be known, the discovery of the combination of the hands-free technology phone answering with the other aspects of the present invention are considered to be part of the present invention.

Figure 17:
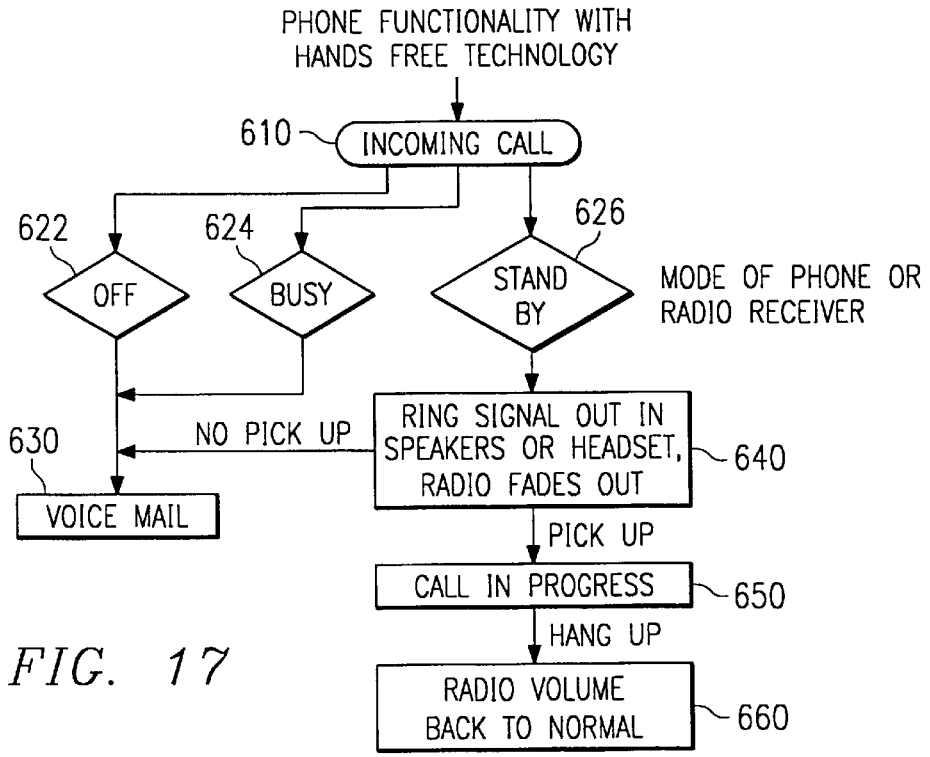
FIG. 17 is a block diagram illustrating phone functionality with hands free technology utilized in a phone transmission embodiment of the present invention.

Referring now to FIG. 17, there is shown a flow diagram illustrating one example of a process used by the present invention for hands free technology phone answering. The process begins by the receiving of an incoming call at step 610. The incoming call is routed from step 610 depending upon the mode of the phone or electronic audio equipment. If the phone or electronic audio equipment is in an off mode, the incoming call is routed at step 622 to voice mail at step 630. If the phone or electronic audio equipment is in a busy mode, i.e. operating on a call in progress, the incoming call is routed at step 624 to the voice mail at step 630. If the phone or electronic audio equipment is in a standby mode, the incoming call is routed at step 626 to a step 640. In step 640, the system sends a ring signal through the speakers or headset of the electronic audio equipment, and fades the volume of the electronic audio equipment out. If the incoming call is not answered in response to the ring signal in step 640, i.e. the user does not "pick up" the phone, the incoming call is routed at step 640 to the voice mail in step 630. If a user answers the incoming call in response to the ring signal in step 640, the incoming call is routed at step 640 to progress into a "call in progress" at step 650. Once the "call in progress" is completed in step 650, the user disconnects or "hangs up" the connection and the electronic audio equipment is returned to standby condition and its normal volume and audio play mode at step 660.

Figure 18:
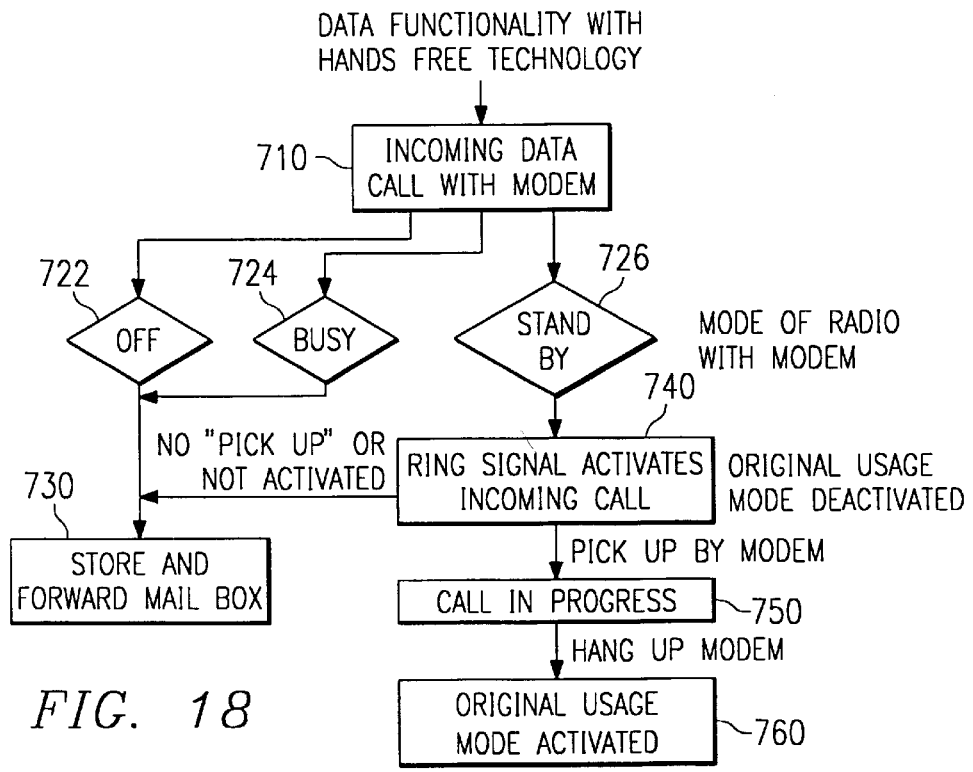
FIG. 18 is a block diagram illustrating data functionality with hands free technology utilized in a data transmission embodiment of the present invention.

Referring now to FIG. 18, there is shown a flow diagram illustrating one example of hands free technology used in the present invention for data type functionality. The process begins with an incoming data call received at step 710. The incoming data call is routed from step 710 depending on the mode of the electronic audio equipment with the modem. If the electronic equipment is in an off mode, the incoming call is routed at step 722 to a store and forward mailbox at step 730. If the electronic audio equipment is in a busy mode, i.e. operating on a current call in progress, the incoming call is routed at step 724 to the store and forward mailbox in step 730. If the electronic audio equipment is in a standby mode, the incoming data call is routed at step 726 to a step 740. In step 740, a ring signal is generated for indicating that an incoming data call exists. If the automatic connection or "pick up" of the modem is not activated, the incoming call is routed at step 740 to the store and forward mailbox at step 730. If the modem pick up is activated, the incoming data call is routed at step 740 to the call in progress mode at 750. After the call in progress has terminated, the modem disconnects or "hangs up" and the electronic audio equipment is returned to the original volume and function, and is placed into the standby mode at step 760.

Figure 19:
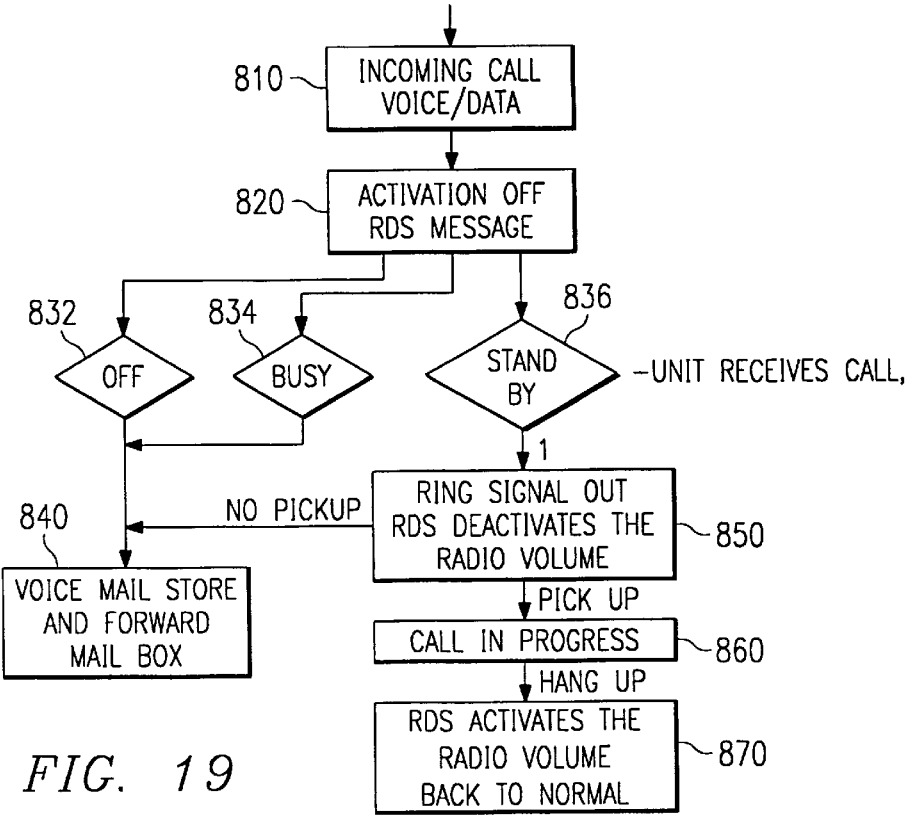
FIG. 19 is a block diagram illustrating telecommunications functionality with a RDS (Radio Data System) radio receiver.

Referring now to FIG. 19, there is shown a flow diagram illustrating the process of receiving an incoming call on a Radio Data System (RDS) electronic audio system. The process begins with an incoming voice or data call at the step of 810. Sensing of an incoming call activates the RDS message at step 820 and the telecommunications unit receives the call. The routing of the incoming call is determined by the mode of the telecommunications unit. If the telecommunications unit is in an off mode, the incoming call is routed at step 832 to voice mail storage and forwarding mail box at step 840. If the telecommunications unit is in a busy mode, i.e. operating with a call in progress, the incoming call is routed at step 834 to the voice mail storage and forwarding mail box at step 840. If the telecommunications unit is in a standby mode, the incoming call is routed at step 836 to step 850. In step 850, a ring signal is generated and the RDS electronic equipment deactivates the volume of the electronic audio system. If the incoming call is not picked up, the incoming call is routed at step 850 to the voice mail storage and forwarding mail box at step 840. If the incoming call is picked up, the incoming call is converted to a call in progress at step 860. Once the call in progress has terminated, the telecommunications unit is disconnected or "hanged up" and the RDS electronic equipment activates the volume back to a normal condition and sets the telecommunications unit to a standby mode in step 870.

Figure 20:
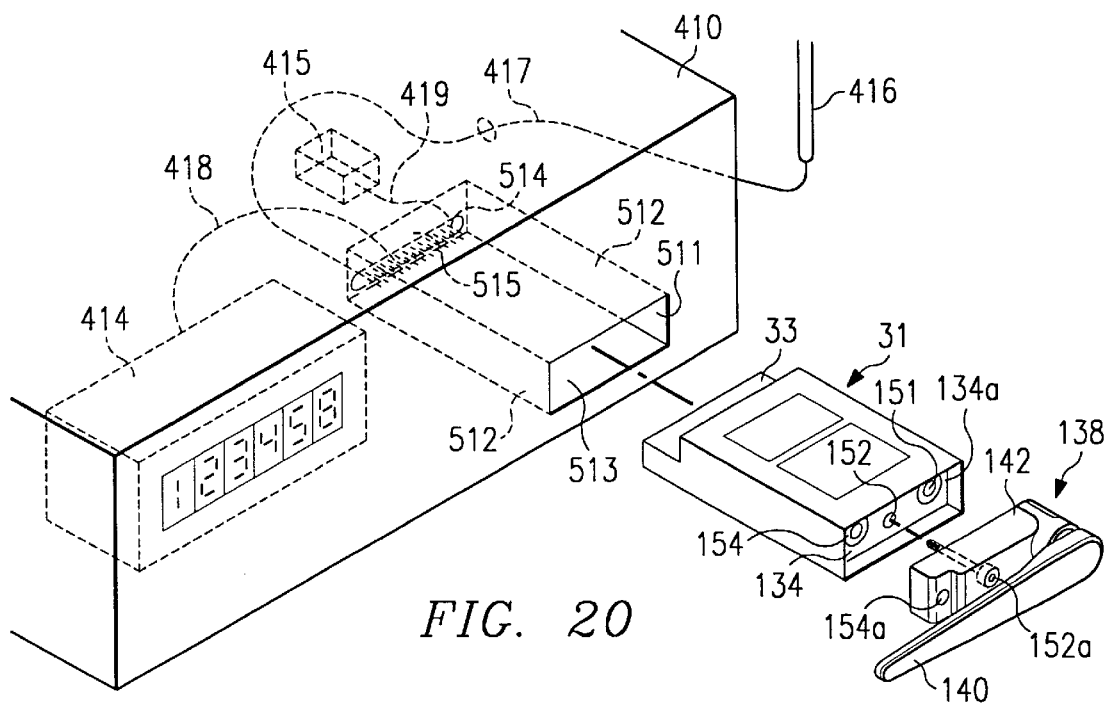
FIG. 20 is an exploded, perspective view of a modular unit constructed in accordance with the principles of the present invention and illustrating its adaptability for use in a utility meter for transmitting information pertaining to a numerical information of the meter.

Referring now to FIG. 20 there is shown an illustration of yet another aspect of the present invention. The combination of use of the modular unit 31 is thus illustrated with its placement within a utility meter 410. Utility meters numerically register the magnitude of items such as electricity, gas, or the like. It should be noted that either module 31 or 131 could be used in such a combination depending on the need for an external antenna. Reference to module 31 and not to module 131 is for purposes of illustration only. The meter 410 includes a mounting slot 511 for the installation of the modular unit 31. The slot 511 is constructed with side walls 512 and a frontal opening 513. A mating connector 514 is disposed along end 515 for mating with the connector 33 of the module 31. The meter 410 has a display 414 for displaying the numeric information of the meter 410. A cable 418 connects the numeric information of the display 414 to preassigned pins of the mating connector 514.

Still referring to FIG. 20, the connecting end 134*a* of the module 31 includes a recess 134 which houses the connectors 151 and 154. The connector 151 is preferably a coaxial connector adapted for coupling to antenna 138, while connector 154 is constructed for connecting external power (if necessary) to the modular unit 31. The modular antenna structure 138 is also shown in position for mounting to the end 134*a* of the unit 31. An AC/DC power supply (not shown) provides external electrical power to the module 31 from an external source. In one construction of the present invention, the connector 33 of the module 31 can be modified to receive the power from an internal power source 415 of the meter 410 through a cable 419 and the mating connector 514.

Still referring to FIG. 20, in a construction which utilizes the module 131 instead of module 31, the meter 410 includes a power supply 415 and an antenna 416. The power supply 415 is connected to power contacts in the mating connector 514 by a cable 419. The power contacts in the mating connector 514 are adapted for connecting with the contacts 149*a* and 149*b* of the connector 133 (shown in FIG. 4). The antenna 416 is connected to an antenna contact in the mating connector by a cable 417. The antenna contacts in the mating connector 514 connect with the contact 149*c* of the connector 133 (shown in FIG. 4).

Still referring to FIG. 20, although the present invention has been illustrated using a meter such as a utility meter, the present invention can also be used with other equipment, such as electrical readers, gas meter readers, pipeline meters, container traffic, or the like, that produce numeric or other information that needs to be transmitted into a central database. The present invention applies to both commercial and consumer applications. Discovery of the combination of a telecommunications transceiver module with a utility meter which provides numerical information is considered to be a part of the present invention. Users can receive the numerical data displayed on the meter 410 by dialing the telecommunications module of the meter 410. This allows the user to not only capture data from the meter 410, but also to perform remote surveillance and management of the site, reader, or other equipment. The use of a module 31 or 131 which operates on a packet switching technology, such as Mobitex, provides a secure transmission of the data. The size of a radio modem on a module such as a PCMCIA module, allows easy maintenance and service by replacing the faulty modules with a new module.

As described above it may be seen that the modular units 31 and 131 have multiple uses. From a design perspective, they may be relatively thick, on the order of 10.5 mm and the particular electronic equipment will have to be appropriately modified in design for receipt thereof. The connector 33 of the modular unit 31 may include a standard PCMCIA 3.0 mm card interconnection. Moreover, as described above the card edge connector 33 may include special pin outs 149*a* and 149*b* for higher power connection and consumption in certain situations.

It may further be seen from the figures above that antenna connections, as well as special power connections, enable the implementation of a modular unit with a minimum of special adaptations required for individual installations in electronic systems or equipment. In this way, the system of the present invention enables the construction of modular radio communications units for flexible adaptation to different standards and different circumstances but which can be incorporated into a standard card slots in a variety of electronic devices that are on the market today.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. An improved electronic audio system of the type having a radio receiver which provides audio signals to at least one speaker and provides functional information on a display, said radio receiver having a housing, the improvement comprising:
- a module port disposed in said housing and having a module connector;
- a module removably disposed in said module port and having:
  - a second housing;
  - a system connector for engagement with the module connector of said module port; and
  - a telecommunications transceiver for communicating data signals with one of a plurality of standardized wireless networks in accordance with at least one preselected communication standard, wherein the telecommunication transceiver provides data received signals to said display through the system connector of said module and the module connector of said module port; and
- a keypad, wherein said keypad provides data transmission signals to the telecommunications transceiver through the module connector of said module port and the system connector of said module.

2. The improved electronic audio system as set forth in claim 1, wherein said radio receiver is a personal radio player.

3. The improved electronic audio system as set forth in claim 1, wherein said radio receiver is an automobile radio player.

4. The improved electronic audio system as set forth in claim 1, wherein said radio receiver is a television set.

5. The improved electronic audio system as set forth in claim 1, wherein said radio receiver is a video tape player.

6. The improved electronic audio system as set forth in claim 1, wherein said module port and said module are of a PCMCIA standard.

7. The improved electronic audio system as set forth in claim 1, further comprising said electronic audio system having a battery power source disposed in said housing which supplies electrical power to said radio receiver, and wherein the telecommunications transceiver of said module receives electrical power from said battery power source through the system connector of said module and the module connector of said module port.

8. The improved electronic audio system as set forth in claim 7, wherein said module port and said module are of a PCMCIA standard, and wherein the module connector and the system connector are modified from the PCMCIA standard to include power contacts for transmitting the electrical power from said battery power source to said telecommunications transceiver.

9. The improved electronic audio system as set forth in claim 1, further comprising an external power source which provides electrical power to the telecommunications transceiver of said module through a power connector mounted to the second housing.

10. The improved electronic audio system as set forth in claim 1, further comprising said electronic audio system having an antenna which is used by said radio receiver to receive radio transmissions, wherein the telecommunications transceiver of said module is coupled with said antenna through the system connector of said module and the module connector of said module port, and wherein the telecommunications transceiver communicates with said standardized network through said antenna.

11. The improved electronic audio system as set forth in claim 10, wherein said module port and said module are of a PCMCIA standard, and wherein the module connector and the system connector are modified from the PCMCIA standard to include at least one contact for coupling the antenna with the telecommunications transceiver.

12. The improved electronic audio system as set forth in claim 1, further comprising an antenna coupled to the telecommunications transceiver of said module through an antenna connector mounted to the second housing.

13. The improved electronic audio system as set forth in claim 1, further comprising means for fading out the audio signals from said radio receiver to said at least one speaker and emitting a signal indicating that an incoming call is available, upon sensing an incoming call to said telecommunications transceiver.

14. The improved electronic audio system as set forth in claim 1, wherein said keypad is a component of said radio receiver.

15. The improved electronic audio system as set forth in claim 1, wherein said keypad is coupled to said electronic audio system by a cable extending therefrom.

16. The improved electronic audio system as set forth in claim 1, wherein said keypad is coupled to said electronic audio system by an infra red communication link.

17. The improved electronic audio system as set forth in claim 1, wherein said keypad is coupled to said electronic audio system by a radio communication link.

18. The improved electronic audio system as set forth in claim 1, wherein said radio receiver is a portable radio player.

19. An improved electronic audio system of the type having a recording medium player which provides audio signals to at least one speaker and provides functional information on a display, said recording medium player having a housing, the improvement comprising:
- a module port disposed in said housing and having a module connector;
- a module removably disposed in said module port and having:
  - a second housing;
  - a system connector for engagement with the module connector of said module port; and
  - a telecommunications transceiver for communicating data signals with one of a plurality of standardized wireless networks in accordance with at least one preselected communication standard, wherein the telecommunication transceiver provides data received signals to said display through the system connector of said module and the module connector of said module port; and
- a keypad, wherein said keypad provides data transmission signals to the telecommunications transceiver through the module connector of said module port and the system connector of said module.

20. The improved electronic audio system as set forth in claim 19, wherein said recording medium player is a personal tape player.

21. The improved electronic audio system as set forth in claim 19, wherein said recording medium player is an automobile tape player.

22. The improved electronic audio system as set forth in claim 19, wherein said recording medium player is a compact disk player.

23. The improved electronic audio system as set forth in claim 19, wherein said module port and said module are of a PCMCIA standard.

24. The improved electronic audio system as set forth in claim 19, further comprising said electronic audio system having a battery power source disposed in said housing which supplies electrical power to said recording medium player, and wherein the telecommunications transceiver of said module receives electrical power from said battery power source through the system connector of said module and the module connector of said module port.

25. The improved electronic audio system as set forth in claim 24, wherein said module port and said module are of a PCMCIA standard, and wherein the module connector and the system connector are modified from the PCMCIA standard to include power contacts for transmitting the electrical power from said battery power source to said telecommunications transceiver.

26. The improved electronic audio system as set forth in claim 19, further comprising an external power source which provides electrical power to the telecommunications transceiver of said module through a power connector mounted to the second housing.

27. The improved electronic audio system as set forth in claim 26, further comprising said electronic audio system having an antenna, wherein the telecommunications transceiver of said module is coupled with said antenna through the system connector of said module and the module connector of said module port, and wherein the telecommunications transceiver communicates with said standardized network through said antenna.

28. The improved electronic audio system as set forth in claim 27, wherein said module port and said module are of a PCMCIA standard, and wherein the module connector and the system connector are modified from the PCMCIA standard to include at least one contact for coupling the antenna with the telecommunications transceiver.

29. The improved electronic audio system as set forth in claim 19, further comprising an antenna coupled to the telecommunications transceiver of said module through an antenna connector mounted to the second housing.

30. The improved electronic audio system as set forth in claim 19, further comprising means for fading out the audio signals from said recording medium player to said at least one speaker and emitting a signal indicating that an incoming call is available, upon sensing an incoming call to said telecommunications transceiver.

31. The improved electronic audio system as set forth in claim 19, wherein said keypad is a component of said recording medium player.

32. The improved electronic audio system as set forth in claim 19, wherein said keypad is coupled to said electronic audio system by a cable extending therefrom.

33. The improved electronic audio system as set forth in claim 19, wherein said keypad is coupled to said electronic audio system by an infra red communication link.

34. The improved electronic audio system as set forth in claim 19, wherein said keypad is coupled to said electronic audio system by a radio communication link.

35. The improved electronic audio system as set forth in claim 19, wherein said recording medium player is a portable tape player.

36. The improved electronic audio system as set forth in claim 19, wherein said recording medium player is a video cassette recorder.

* * * * *